United States Patent [19]

Bittner et al.

[11] Patent Number: 4,716,649
[45] Date of Patent: Jan. 5, 1988

[54] METHOD OF MAKING A SENSOR FOR A MAGNETIC INDUCTIVE FLOWMETER

[75] Inventors: Franz Bittner, Moers, Fed. Rep. of Germany; Boudewijn J. Poortman, Dordrecht, Netherlands; Kristian Rademacher-Dubbick, Duisburg, Fed. Rep. of Germany; Abram K. Roskam, Sleeuwijk, Netherlands; Udo Stevens, Duisburg, Fed. Rep. of Germany; Wouter T. Tromp, Sliedrecht, Netherlands; Walter Beisler, Bensheim; Siegfried Bock, Mannheim; Hermann Bertsch, Mannheim, all of Fed. Rep. of Germany

[73] Assignee: Rheometron AG, Basel, Switzerland

[21] Appl. No.: 590,780

[22] Filed: Mar. 19, 1984

Related U.S. Application Data

[60] Division of Ser. No. 454,156, Dec. 29, 1982, Pat. No. 4,507,975, and a continuation-in-part of Ser. No. 432,955, Sep. 28, 1982, abandoned.

[30] Foreign Application Priority Data

Nov. 27, 1981 [EP] European Pat. Off. ...... 81/201316.7
May 10, 1982 [WO] PCT Int'l Appl. .... PCT/EP82/0097

[51] Int. Cl.⁴ .............................................. H01F 7/06
[52] U.S. Cl. ..................................... 29/602 R; 29/851
[58] Field of Search ............... 264/61; 174/152 GM, 174/50.61; 73/861.12, 861.13; 320/204; 29/602, 851

[56] References Cited

U.S. PATENT DOCUMENTS

| 2,355,443 | 8/1944 | Jeffery | 264/61 |
| 2,966,704 | 1/1961 | O'Brian et al. | 264/61 |
| 3,876,680 | 1/1974 | Wyatt et al. | 73/861.12 |
| 4,117,588 | 10/1978 | Johnson | 264/61 |

Primary Examiner—Howard N. Goldberg
Assistant Examiner—P. W. Echols
Attorney, Agent, or Firm—Karl F. Ross; Herbert Dubno

[57] ABSTRACT

A measured-value sensor for an inductive flowmeter comprises a fluid impermeable sintered ceramic measuring tube adapted to be positioned in a conductive-liquid flow path. Magnetic coils surround the tube and are adapted to apply a magnetic field to a conductive liquid traversing the path. A pair of diametrically opposite measuring electrodes contact the liquid traversing the path for tapping an induced voltage across the electrodes representing the flow of the liquid along the path, each of the electrodes having a metallic shaft traversing the tube substantially radially and sealingly sintered to the material of the tube. The ends of the ceramic measuring tube are provided with a flange, ground at its peripheral wall surface and fastened by shrinkage stress in a bore of a steel casing. After sintering of measuring tube, conductive paths are manufactured for the formation of grounding rings and other current-conducting components by applying a platinum paste on the ceramic measuring tube and reheating again subsequently. In the process, the paste compacts to form a thin conductor film which is firmly anchored on the surface of said measuring tube.

3 Claims, 10 Drawing Figures

METHOD OF MAKING A SENSOR FOR A MAGNETIC INDUCTIVE FLOWMETER

CROSS REFERENCE TO RELATED APPLICATION

This application is a division of Ser. No. 454,156 filed Dec. 29, 1982 (now U.S. Pat. No. 4,507,975 of Apr. 2, 1985) and a continuation in part of Ser. No. 432,955 filed Sept. 28, 1982 (now abandoned) and corresponding to a national phase application of PCT application PCT/EP/8200097 filed May 10, 1982 and based upon Europatent application 81 201,316.7 filed Nov. 27, 1981.

FIELD OF THE INVENTION

The invention relates to a measured-value sensor for magnetic-inductive flowmeters, utilizing a ceramic measuring tube, which is arranged inside a steel housing and provided on two diametrically opposite sides with measuring electrodes which pass radially through the jacket of the measuring tube and with magnet coils arranged on the jacket and, more particularly, to a method for fastening measuring electrodes and other current-conducting component parts on the ceramic measuring tube of such a measured-value sensor.

BACKGROUND OF THE INVENTION

A magnetic-inductive flowmeter comprises a tubular measured-value sensor which is attached between the connecting flanges of a pipeline and through which flows a conductive flow transverse to the direction of a magnetic field. A voltage proportional to the flow rate is tapped off at two measuring electrodes and conducted via a current conductor to a signal converter. Usually the measuring tube of the measured-value sensor consists of a metal tube provided with an inner jacket with an insulating layer or a plastic tube.

The U.S. Pat. No. 3 750 468 describes a construction with a titanium measuring tube which is fitted over an insulating alumina tube by shrink-fitting. The metallic electrodes pass through an insulating bushing fitted in holes bored in the tube. To effect a fluid-tight seal between the head of the electrodes and the wall of the bore in the alumina tube the alumina wall is metallized and the conical edge of each head is welded thereto. The German Patent application No. 29 50 039 describes a measuring tube with electrodes made of particles of carbon, graphite or metal in the form of powder or fibers embedded in the insulating liner of the measuring tube. Measured-value sensors consisting of a metallic tube providing the mechanical strength and having an insulating liner at the inner wall are complicated and expensive.

On the other hand, a ceramic measuring tube is well known having the advantage of being electrically insulating and resistant to corrosion and which is constructed as a self-supporting member. The German Patent application DE-AS No. 23 30 593 describes a measured-value sensor with a ceramic measuring tube which, with the interposition of sealing rings, can be clamped between two flanges of a pipeline. On the ceramic electrically insulating tube the electrodes are fused to the vitrified inner jacket and are provided with conducting wires which pass through radial bores. The flanges are provided with an annular shoulder against which abuts a sheet metal shroud wrapped from the outside. This construction has the disadvantage that the radial bores form weakness zones in the ceramic measuring tube which, when fluids flow through under high pressure, can result in cracks and destruction of the ceramic body. Furthermore, the fusion of the electrodes onto the vitrified inner jacket during firing does not ensure an absolutely tight seal. The glazed coating on the ceramic body also cracks frequently because of different thermal expansions and stresses, so that the fluid under high pressure can penetrate through pores of the body to the outside.

Furthermore, the ceramic measuring tube of the measured-value sensor is highly susceptible to the effects of impacts and shocks and is able to absorb tensile stresses to a limited extent only. Such ceramic masses likewise do not offer good resistance to changes in temperature such as can occur in conjunction with the hot fluids that have to be measured. The measured-value sensor of the German Patent application DE-AS No. 23 30 593 is therefore not suitable for fluids under high pressure and aggressive and hot fluids.

The German Patent application DE-B No. 10 98 727 has a ceramic measuring tube with measuring electrodes which are designed in the form of a hollow cylinder with a reinforced bottom. The electrodes are fused into radial bores of the measuring tube with a vitreous mass having a coefficient of expansion which is between the coefficients of the materials of the electrodes and the ceramic tube. But a good permanent seal is not available and the vitreous mass cracks because of changes in temperature and of the effects of impacts and shocks. The vitreous mass is not resistant to many mediums.

The European Patent application EP-A1 No. 0047342 describes a measured-value sensor of plastic or ceramic, which can be inserted in a tubular steel casing and with magnetic coils inserted from the outside into recesses passing radially through the casing, and projecting into blind holes of the measuring tube. The measuring electrodes are inserted in lateral bores of the measuring tube and sealed. This construction is, however, because of the arrangement of lateral recesses and bores practically suitable only for measuring tubes of plastic material but not for those of ceramic materials.

In the common field of electrodes the German Patent application DE-A No. 21 19 705 proposes to attach a coating of a mass which includes noble metals or alloys of noble metals to the surface of the electrodes by burning in order to keep the resistance of polarization and the capacitive effect low at the surface of the electrodes. This proposal is concerned only with the coating of a usual metallic electrode for optimizing the electric properties of the electrodes.

For measured-value sensors it is also known to mount between the measuring tube and the connecting flanges of the pipeline, grounding rings that are in contact with the conductive fluid and which are directly grounded or conductively connected with the grounded metal casing of the measured-value sensor. These grounding rings require sealing rings on both sides. Such a construction is complicated and frequently leads to leakages.

OBJECTS OF THE INVENTION

It is the principal object of the present invention to provide a measured-value sensor which is suitable for fluids under high pressure, and for aggressive hot fluids, and which further exhibits a considerably improved mechanical strength. Another object of the invention is to provide an improved method for the manufacture of such a measuring tube.

SUMMARY OF THE INVENTION

The objects of the invention are attained by providing a measuring tube of a tight burnt ceramic material into which shafts of the measuring electrodes are sintered in a leakproof manner.

The measuring tube constructed in accordance with the invention enjoys, to begin with, the benefit of contour-true manufacturability and all the favorable material properties of tight burnt ceramic materials such as high density, elevated bending and tensile strength and the machinability of the vitrified ceramic body. Through the electrode shafts sintered in place we not only ensure a total sealing in the region of the lead-in holes of the electrodes but also eliminate weakness zones caused by bores or the like, so that the ceramic measuring tube exhibits a substantially higher mechanical strength.

Because of the high mechanical strength there is also no need for a jacket of metallic material for increasing the compressive and bending strength. The tight burnt ceramic material has such a high body density that the body does not absorb any fluid. Furthermore, the said ceramic is resistant to any chemically aggressive fluids so that the measured-value sensor made from it has also a considerably greater field of application. Also hot fluids with temperatures beyond 300° C. can be measured with the new measured-value sensor. The surface condition (surface roughness) of the measuring tube furthermore allows the attachment of thin electric conducting paths for the formation of grounding rings and/or other electrode terminals.

The ceramic material for the measuring tube may be chosen dependent on its characteristics from the group of oxide ceramics, carbides, nitrides, borides, steatites or aluminum-magnesium-silicates. These compounds can be primarily aluminum oxide, but also include oxides of beryllium, magnesium, zirconium, thorium, and oxide compounds such as magnesium aluminum oxide and the like. Suitable in the sense of the invention are also all other ceramic materials with identical or similar properties even when they do not belong directly to the group of the oxide ceramic. From the group of carbides and nitrides especially silicon carbide or silicon nitride are suitable.

The powdery raw materials of the ceramic are shaped by compression (compaction), for example by punch pressing or isostatic pressing, and subsequently sintered at high temperatures which depend on the type of the raw material. The sintering of aluminum oxide is carried out, for example, at about 1800° C. Through the sintering, the powder conglomerate is transformed into a solid body, whereby the body does not melt or only partial melting (fritting) occurs.

The shafts for the electrodes sintered into the measuring tube consisting of the ceramic and also the shapes of the electrodes can be of various dimensions, especially varying with regard to the internal diameter. In the case of a small inside diameter where the electrode site at the inner jacket is accessible only with difficulty, a simple single wire or pin of about 1.5 mm diameter can be sintered in place and can have an inwardly oriented end forming the electrode surface that is in contact with the measured fluid. In lieu of this, the shaft sintered in place can also consist of a little tube whose bottom forms the electrode surface. When the electrode sites are accessible, it is possible to sinter the shaft, as a pin or little tube, in place and to connect it subsequently with a little plate which forms the electrode surface and which lies in a recess at the inside jacket or wall of the measuring tube. Furthermore, a little tube can be sintered in place, into which is inserted from the inside wall of the measuring tube a pin that is seal-welded to the rim of the tube located outside of the measuring tube.

The shafts and electrodes consist preferably of platinum or platinum alloys. Other conductive metals are suitable as long as they permit sintering in place and exclude chemical combination with the ceramic and oxidation of their surfaces.

The good mechanical strength and machinability of the ceramic by grinding allows a particularly simple and secure fastening of the measuring tube in a steel casing which also covers the magnet coils and permits fastening to the two flanges of the pipeline.

Preferably the measuring tube is fastened with its ends through shrinkage stress in bores of the steel casing. This shrink fit secures the measuring tube against twisting and against axial displacement so that later readjustment is dispensed with. There are thus no fastening bores required in the outside wall for special fastening clamps that would impair the mechanical strength of the measuring tube. Because of this type of fastening the ceramic measuring tube lies protected inside the steel casing, and the firm shrinkage connection even prevents a breakage of the ceramic material when the measured-value sensor is dropped or suffers a strong impact or shock. Finally, the shrinkage fit also seals the inside of the steel casing in a leakproof manner against the peripheral jacket surfaces of the measured-value sensor. If in extreme cases this sealing is not sufficient, then a thin sealing mass or the like can additionally be applied to the peripheral wall surfaces or bore surfaces.

Also an additional fastening of the flanges in the bores of the casing can be provided by gluing or cementing of the measured-value sensor which is heated by hot liquids to temperatures at which the shrinkage fit is reduced.

For simple constructions where no shrinkage fit is provided, the fastening can also be carried out by gluing or cementing. Also on ceramic measuring tubes with a relatively thin wall thickness the fastening can be accomplished through shrinkage stress.

If required, ring bearings of ceramic or metallic material can be fastened onto the ends of the measuring tube by a shrink fit, so that the measuring tube is secured through shrinkage stress in the bores of the steel casing. However, it is also possible to provide the measuring tube at its ends with radially outwardly oriented flanges with which it is fastened by shrinkage stress in the bores of the steel casing. In this case it is useful to grind or to polish the peripheral wall surfaces of the flanges to an outside diameter suitable for a shrink fit.

Because of its polycrystalline structure the tight burnt ceramic material also has, even with an apparently completely smooth surface, a surface roughness that is utilized according to the invention for the attaching of conductive paths in that there is applied a conductive path forming the grounding ring to at least one face of the measuring tube and conductively connected with the grounding connection. The conductive path forming the grounding ring can be applied onto a chamfer which enlarges the inside wall of the measuring tube. One or more connecting paths can be radially mounted at a face of the measuring tube and can serve as a grounding connection. For a conducting path with the grounding connection the conductive paths can be laid across the faces up to the external jacket surface of the measuring tube where they lie in contact with the shrunk-on steel casing that forms the grounding connection. When cement or putty masses are employed for the fastening of the measuring tube in the boreholes of the steel casing either alone or in conjunction with shrinkage stress, then the conductive connection between the conductive paths forming the grounding rings and the steel casing can also be accomplished through current-conducting particles, e.g. of metal or graphite, mixed into the putty mass.

It is also possible to apply to the outer jacket of the measuring tube a conductive shaft that is conductively connected with the shaft of one measuring electrode and extends up to about one half of the circumference of a connector point—arranged beside the other measuring electrode—for a conducting wire to a signal converter. These conductive paths cnsist of a metal coating only a few microns thick which are firmly anchored on the electrically insulating ceramic body and which dispense with the previously required electric components and wiring parts for various purposes.

While grounding rings in the past were special components which had to be installed with sealing rings on both sides, they are according to the invention an integral part of the measured-value sensor. The side-by-side lying connector points for the conducting wires leading to the signal converter facilitate wiring. If needed, the conductive path connected to the electrode can be provided with shielding in order to exclude the effect of interference.

For the fastening of measuring electrodes and other current-conductive components to a ceramic measuring tube of a measured-value sensor for inductive flowmeters through the fastening of a shaft of the measuring electrodes in a position leading radially through the wall of the measuring tube, the invention provides a particularly suitable method in which the shaft of each measuring electrode is radially arranged in an unvitrified molded body consisting of ceramic raw material, and is sintered in place during the ceramic burning of the molded body blank. Subsequently there is applied onto the ceramically sintered measuring tube a metal powder paste to define conductive paths, and the latter are burnt-on by a new firing of the measuring tube.

The arrangement of the shafts in the unburnt (unvitrified) blank, which in the ceramics industry is also known as a "green compact" can be carried out through direct forming-in during the compressing (compacting) of the powdery raw material, or according to a preferred method bores are worked into the compressed blank into which the shafts are inserted before the burning of the blank, whereby care must be taken to ensure close contact with the raw material mass. Through the ceramic burning at the sintering temperature customary for the ceramic material, e.g. about 1800° C. for $Al_2O_3$, the shafts are tightly sintered in place. The metal powder paste for the conductive paths, which has to be applied onto the sintered measuring tube, can consist, for example, of a platinum powder paste, which forms on subsequent heating of about 800° C. and more a thin metal layer of several microns, whereby the binder ingredients of the paste evaporate or burn off and the metal layer becomes firmly anchored in the microrough surface of the ceramic body.

BRIEF DESCRIPTION OF THE DRAWING

The measured-value sensor of the invention and the manufacturing method provided are explained in detail with the aid of the drawing in which.

SPECIFIC DESCRIPTION

Figure 1:
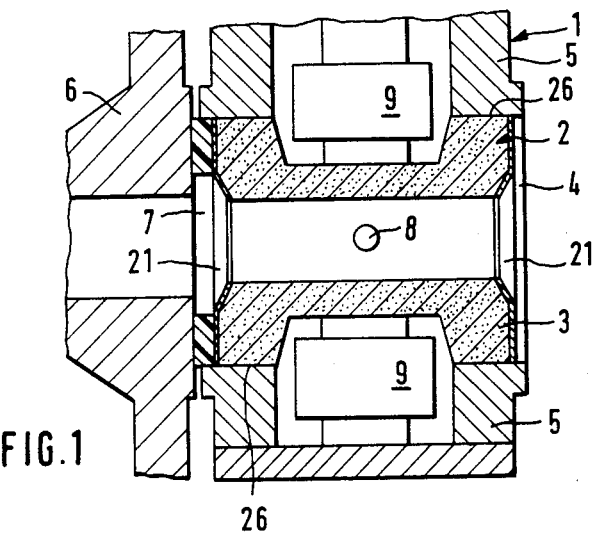
FIG. 1 is a longitudinal section of a measured-value sensor with a ceramic measuring tube, whose ends are shaped like flanges.

The measured-value sensor 1, presented in FIG. 1 in its basic design, is for example equipped with a ceramic measuring tube 2 of oxide ceramic. The measuring tube 2 has the shape of a thread spool with radially outwardly extending flanges 3 at its two ends. The polished peripheral wall surfaces 26 of the two flanges 3 are fastened by shrinkage stress in bores 4 of a steel casing 5. The steel casing 5 can consist for example of cast steel.

The measured-value sensor 1 is fastened in customary manner between the flanges of two pipes 6 of a pipeline; sealing rings 7 are provided between the endfaces 22 of the ceramic measuring tube 2 and the contact surfaces of the flanges assigned to the line pipes 6. The connection between the measured-value sensor 1 and the flanges of the line pipes 6 can be made either through a direct screw joint or, in the case of smaller nominal diameters, by means of screw bolts or the like.

Figure 2:
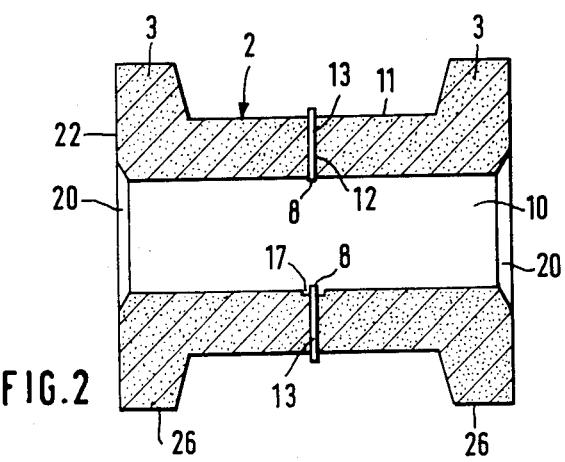
FIG. 2 is a longitudinal section of a ceramic measuring tube with sintered-in electrode shafts.

To the measured-value sensor 1 are assigned, as shown in FIG. 2, two measuring electrodes 8 which project radially through the wall of the ceramic measuring tube and form electrode surfaces at the inside jacket 10. Two magnet coils 9 are arranged along the outside wall 11 of the ceramic measuring tube 2 diametrically opposite one another and offset by 90° from the pins. They can abut for example with pole shoes at the outside jacket 11 of the ceramic measuring tube 2. The steel casing 5 serves also for the magnetic field return.

For example the ceramic measuring tube 2 is made of material of the oxide ceramic. The powdery and nonplastic raw material is compressed (compacted) in known manner with the aid of punch presses or through isostatic pressing. In this molding, account must be taken of the extent of shrinkage arising during the subsequent sintering process. The compressed and shaped but still unburnt blank is formed with two radial bores 12 into each of which is inserted one shaft 13 of platinum.

The shafts 13 to be sintered in place and the electrode surfaces can be variously shaped depending upon the dimensions of the measuring tube 2 and the provided electrode shape. If the electrode sites at the inside jacket 10 of a measuring tube 2 with a small nominal width of up to about 15 mm are difficulty accessible, then shafts 13 are chosen whose inwardly directed end directly forms the electrode surface which stands in conductive connection with the measured fluid. For this, we can use for example a single wire or pin (cf. top half of FIG. 2) of about 1.5 mm diameter, or a small tube 14 with a closed bottom 15 (cf. FIG. 5).

Figure 5:
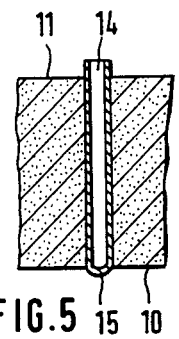
FIG. 5 is a section showing the use of a tubular electrode shaft.

In the embodiment of FIG. 5 the tube 14 is so inserted into the mass that after the sintering the bottom 15 runs approximately in alignment with the inside jacket 10 of the ceramic measuring tube 2. If the electrode sites at the inside jacket 10 of the measuring tube 2 are accessible, then a solid pin 16 (cf. FIG. 6) can be sintered in place as shaft 16, or a small tube to which is molded or affixed a little plate, which forms the electrode surface, or to which such a little plate is welded or riveted-on after the sintering operation.

The shaft 13 in the form of a pin or tube consists of platinum or another metal which during the subsequent sintering of the ceramic does not enter into a chemical combination with the ceramic material and which also does not oxidize on its surface during the high temperatures.

When the raw material for the oxide ceramic consists for example of aluminum oxide, the sintering of the ceramic measuring tube 2 is carried out at about 1800° C. For other ceramic materials the respective sintering temperatures have to be maintained. After the sintering process the shafts 13 are found to be sintered gastight into the jacket of the ceramic measuring tube 2. In FIG. 2 we show in the top half a shaft 13 which directly forms with its inwardly pointing end the measuring electrode 8 or the measuring electrode surface.

Figure 6:
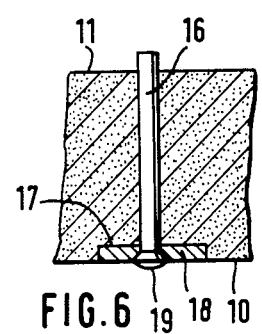
FIG. 6 is a section showing the use of a pin-shaped electrode shaft.
Figure 3:
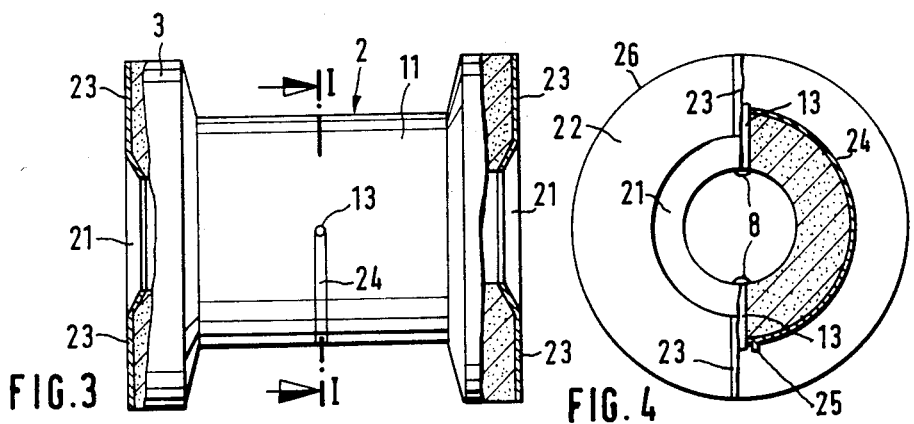
FIG. 3 is an elevational view of the tube of FIG. 2 but partially broken away and provided with burnt-on conductive paths.
Figure 4:
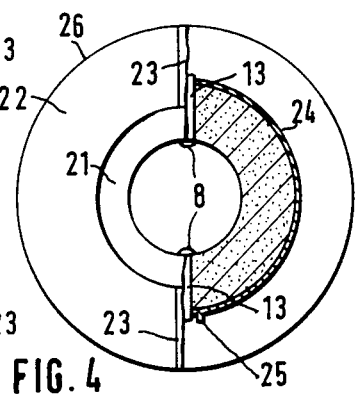
FIG. 4 is a view seen from the front and, respectively; in partial section along the line I—I of the tube of FIG. 3.

In the bottom half of FIG. 2 on the other hand we show an embodiment where the shaft 13 is designed as a solid pin 16, as is shown in FIG. 6 in a larger scale. Here a recess 17 is formed at the inside jacket 10 in addition to the bore 12 or the pin 16, respectively.

After the sintering of the ceramic measuring tube the shaft 13 or pin 16 is tightly fitted in place. Onto the inwardly oriented end of the shaft 13 or pin 16 is mounted a small plate 18 provided with a small bore and laid into this recess 17. The end of the shaft 13 or pin 16 projecting through the little plate 18 is then connected to be electrically conductive with the plate 18, for example by being formed into a rivet head 19. On this embodiment the plate 18 forms the inwardly pointing electrode surface.

Figure 7:
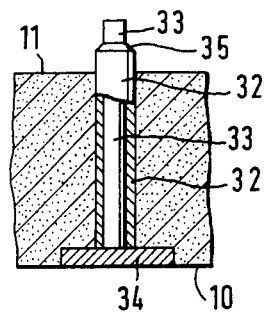
FIG. 7 is a section showing the use of an electrode shaft consisting of a little tube and a pin.

For measuring tubes 2 with electrode sites accessible from the inside, the embodiment diagrammatically shown in FIG. 7, where first a tube 32, open at both ends is sintered-in, can be used. Into the sintered-in tube 32 we subsequently insert a pin 33 which carries a plate 34 forming the electrode surface and which is sealwelded with the rim of the tube 32 located outside of the measuring tube (cf. the weld seam 35 in FIG. 7).

The shafts 13 which can have various shapes can either be inserted in the manner already mentioned in radial bores 12 of the unburnt blank, but it is also possible to mold-in the shafts 13 in their various embodiments directly during the compressing and molding of the measuring tube 2 from the ceramic material.

After the ceramic burning of the measuring tube 2 illustrated in FIGS. 1 to 4, the peripheral jacket surface 26 and the interfaces 22 are machined by grinding. The outside diameter of the peripheral jacket surface 26 is so selected that it permits a shrink fit in the bores 4 of the steel casing 5.

Onto the ceramically burnt and subsequently ground measuring tube 2 we apply conductive paths 21, 22 and 23 by means of a platinum paste. Two conductive paths 21 are arranged on the two interfaces of the measuring tube 2 in the region of a chamfer 20. Both conductive paths form after another heat treatment grounding rings which are connected through conductive paths 23, arranged at the interfaces 22.

The conductive path 24 connects at the shaft 13 of the one electrode 8 and runs across one half the circumference of the outside jacket 11 to about beside the opposite shaft 13 of the other measuring electrode 8 and ends there at a connecting point 25. The platinum paste can be spread, pressed or printed onto the surface in any customary manner.

Subsequently the ceramic measuring tube provided with the platinum paste is again heated to about 800° C. or more depending on the paste. The metal powder contained in the paste condenses thereby into a dense metal film, which is anchored in the slightly rough surface of the ceramic material and forms a current conductor. Instead of a platinum paste other masses can be used which form a conductive path by burning-on or evaporation.

The conductive paths 21 applied to the interfaces of the measuring tube 2 serve, in conjunction with the radial conductive paths 23, for the grounding of the conductive measuring fluid in order to deflect interface voltage. The conductive path 24, leading across the outside jacket 11, on the other hand permits during installation a wiring of two close together lying sites, that is, the outer end of the shaft 13 of the one measuring electrode 8 and the connector point 25 of the other measuring electrode 8.

Conductive paths according to this method can however also be provided on the ceramic measuring tube 2 for other purposes. It is possible to provide on the inside wall 10 conductive paths or conductive elements which are connected with a shaft 13 and form flat electrodes.

The measuring tube 2 provided with the conductive paths 21, 23 and 24, is fastened to the polished peripheral general surfaces 26 of the flanges 3 in the bores 4 of the steel casing 5 through shrinkage stress. For this method of fastening, the steel casing 5 is heated to a temperature of 300° C. or more and pushed onto the flanges 3 of the cold measuring tube 2, whereby the good resistance to temperature changes of the ceramic material is utilized.

When in simpler embodiments a fastening through shrinkage stress is not required, then the outside diameter of the peripheral general surfaces 26 can be so designed that it can be inserted at normal temperature into the bores, and the fastening is accomplished by gluing or cementing of the bearing surfaces.

Figures 8, 9:
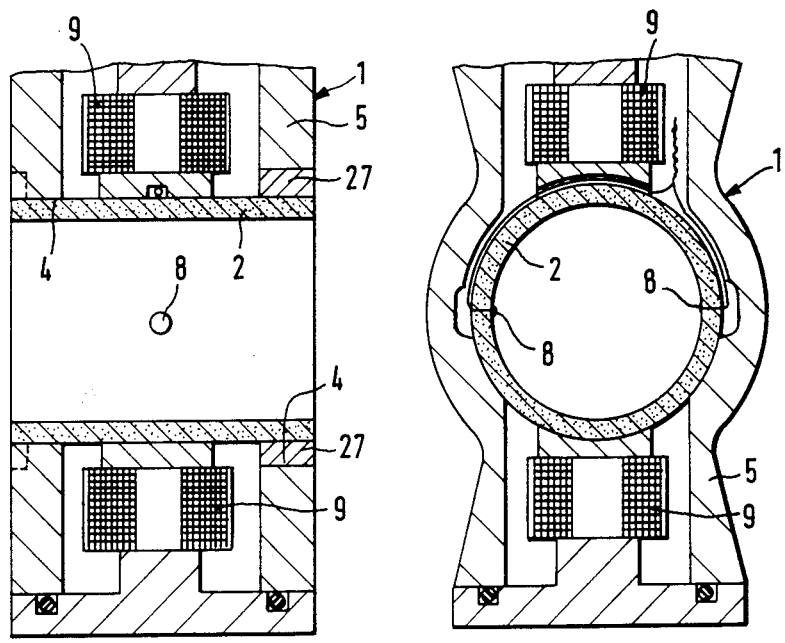
FIG. 8 is a partial longitudinal section of another measured-value sensor with a simple measuring tube.
FIG. 9 is a transverse cross section through the embodiment of FIG. 8.

While a ceramic measuring tube with end flanges 3 according to FIGS. 1 to 4 is particularly suitable for small passage cross sections, it is also posssible to give to the measuring tube 2 of ceramic a simple tube form, whereby also the wall thickness can be relatively thin as shown in FIGS. 8 and 9.

Also on a measuring tube consisting of compactly burnt ceramic and of simple tube shape, the shaft of the measuring electrode can be compactly sintered, and fastening in the steel casing 5 through shrinkage stress and the application of conductive paths is possible. Beside a direct fastening through shrinkage stress, as illustrated in FIG. 8 on the left side, it is also possible to mount at each end of the measuring tube 2 first a respective bearing ring 27 of ceramic or metallic material through shrinkage stress, and subsequently to fasten the measuring tube with the aid of these bearings 27 through shrinkage stress in the bores 4 of the steel casing.

Figure 10:
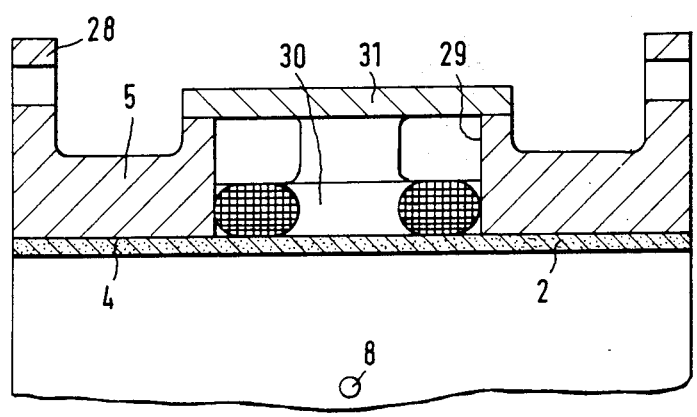
FIG. 10 is a partial longitudinal section through another embodiment of a measured-value sensor with a measuring tube fastened through shrinkage stress.

The embodiment shown in FIG. 10 exhibits a direct fastening through shrinkage stress, whereby the bore 4 forms however a relatively large bearing surface that is particularly suitable for a favorable clamping-in of thin-walled measuring tubes 2 of oxide ceramic. FIG. 10 illustrates further the arrangement of customary casing flanges 28 for connection to a pipeline (not depicted) and lateral recesses 29 into which can be inserted the magnet coils 30 from the outside, and which is provided with a cover plate 31, capable of being screwed on.

The ceramic material can be primarily composed of aluminum oxide, but also oxides of beryllium, magnesium, zirconium, thorium, oxide compounds such as magnesium aluminum oxide and the like. Suitable in the sense of the invention are however also all other ceramic materials with identical or similar properties, even when they do not directly belong to the group of oxide ceramics, e.g. silicon nitride, silicon carbide, aluminum-magnesium-silicate, steatite or the like.

We claim:

1. A method of fastening a measuring electrode and other current-conducting components to a ceramic measuring tube of a measured-value sensor for a magnetic-inductive flowmeter by the securing of a shaft of the measuring electrode in a position leading radially through the wall of said measuring tube, comprising the steps of:
   radially arranging the shaft of each measuring electrode in an unburnt molded body consisting of ceramic raw materials;
   sintering said shafts in place in said body by a ceramic burning of the molded body;
   subsequently applying onto the resulting ceramically sintered measuring tube a metal powder paste in the form of conductive paths; and
   burning on said paths by a new firing of the measuring tube.

2. A method in accordance with claim 1 wherein platinum or platinum alloys are used for said measuring electrodes and shafts and that a platinum powder paste is used for said conductive paths.

3. A method in accordance with claim 1 wherein said measuring tube consists of a tight-burnt aluminum oxide and the shafts are tightly sintered-in at about 1800° C. and that the platinum powder paste is burnt-on at a temperature of about 800° C.

* * * * *